2,859,191

STABLE AQUEOUS DISPERSIONS OF COPOLYMERS OF VINYL ACETATE WITH SALTS OF ALLYLSULFONIC ACID AND METHALLYLSULFONIC ACID AND PROCESS FOR PREPARING SAME

Norris Turnbull, Grand Island, N. Y., assignor to E. I. du Pont de Nemours and Company, Wilmington, Del., a corporation of Delaware No Drawing. Application July 8, 1954
Serial No. 442,190

12 Claims. (Cl. 260—29.6)

This invention relates to the production of new stable aqueous dispersions of polyvinyl acetate.

It is an object of this invention to produce a water-insensitive stable polymer of vinyl acetate as an aqueous dispersion of high solids content and good shelf life and dilution stability. It is another object to produce a dispersion of vinyl acetate polymer having good film forming characteristics. A further object is to produce a polyvinyl acetate dispersion suitable for use in water base paint formulations. Other objects will become apparent in the further discussion of this invention.

These and other objectives can be achieved by the polymerization of vinyl acetate in aqueous medium in the presence of a persulfate polymerization initiator or catalyst and in the presence of a small amount of a water-soluble salt of allylsulfonic acid ($CH_2=CH—CH_2SO_3H$) or of a water-soluble salt of methallylsulfonic acid

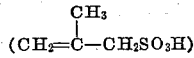

It is essential that the amount of the allyl or methallylsulfonic acid salt used constitutes not more than 1% by weight of the resulting polymeric solids produced by the polymerization to achieve the superior dispersion and film qualities to be described further.

Dispersions of polyvinyl acetate can thus be made having low viscosity at 50% by weight solids concentration and small particle size of the order of 0.1 to 1.0 micron. These dispersions require no other dispersing agent since they are stable for many weeks at temperatures as low as +5° C., and can be diluted to solids concentration well below 10% without losing stability.

Films cast at room temperatures from these dispersions are colorless, homogeneous, transparent, have high gloss and high adhesion to glass. With standing at 72° F. for periods upwards of 48 hours and at a relative humidity of about 50%, these films become less and less water-sensitive and eventually cannot be redispersed in water. Films from dispersions containing below about 0.12% by weight of the allyl or methallylsulfonic acid salt referred to the polyvinyl acetate became highly water-insensitive and withstood more than 10,000 wet rub oscillations without any signs of wear or loss of gloss. Water extractable solids from the film were at a much lower level of concentration than from films prepared from polyvinyl acetate emulstions dispersed with hydroxyethylcellulose or polyvinyl alcohol.

Such water extractable solids from the films made by the use of allyl and methallyl sulfonic acid salts will in general be less than 1% of the weight of said films. Further, such water extractable solids have no film forming characteristics.

The following examples further illustrate the invention.

Example 1

A mixture of 250 grams of distilled water, 0.6 gram potassium persulfate and 0.3 gram of sodium allylsulfonate was placed in a 1-liter, 3-necked flask fitted with a glass anchor-type stirrer, reflux condenser, thermometer well and nitrogen inlet. The flask was heated in a water bath until the contents were at 82° C. and then 250 grams of vinyl acetate was added drop by drop at a rate which kept the reaction temperature at 81–83° C. with gentle reflux and moderate stirring of the contents. In about 80 minutes the addition was complete and heating was continued for about another 10 minutes until the temperature rose to 85° C. Then the dispersion was cooled to about 30° C. in 20 minutes with continued stirring. Over 461 grams of dispersion was poured out of the flask with only a few grams of coagulum adhering to the stirrer and the thermometer well.

The dispersion thus formed contained about 50% solids by weight and had a viscosity of 20 centipoises with no perceptible odor. Particle size was less than 0.2 micron, except for a few aggregates of 3–6 micron. The dispersion was stable and yielded a film on glass which was clear, colorless and homogeneous and had high gloss. After drying the film at 72° C. and 50% relative humidity for 48 hours, the film was water repellent, and withstood more than 10,000 wet scrub test oscillations with no loss of gloss and no apparent erosion.

Example 2

In this experiment, 125 grams water, 1.25 grams potassium persulfate and 0.19 gram sodium allylsulfonate were placed in the same apparatus as in Example 1. With the contents at a temperature of about 80–82° C., 125 grams vinyl acetate was added in about 65 minutes. The resultant stable dispersion contained 43% solids by weight and had no odor. The film cast on glass had a high gloss and was clear homogeneous and transparent. The film was non-redispersible in water after drying for 48 hours. After more than 11,000 oscillations in the wet scrub test there was barely perceptible erosion of the film but no visible break.

Example 3

Apparatus similar to that described in Example 1 was used. The reaction flask was charged with 125 grams water, 1.25 grams potassium persulfate and 1.25 grams of a copolymer of vinyl acetate and sodium allylsulfonate of a weight ratio of 90 to 10 respectively. With the reaction contents at a temperature between 82 and 84° C. vinyl acetate was fed into it for 105 minutes until 125 grams had been added. After cooling, the reaction product was a stable dispersion of 10 centipoise viscosity. The solids content was about 50% by weight. Particle size of the dispersed polymer was 0.2 to 1.0 micron. The film made from this dispersion was clear, homogeneous and non-redispersible in water. However, the film had a relatively low wet rub resistance showing breaks after 150 oscillations in the wet rub test.

Any polymerization initiator suitable for the aqueous emulsion polymerization of vinyl acetate may be used but the preferred initiator is potassium persulfate.

Salts of allylsulfonic acid and methallylsulfonic acid suitable for the copolymerization in small amounts with vinyl acetate to form stable aqueous dispersions must be water soluble. Allylsulfonates and methallylsulfonates of the alkali metals are particularly useful. For economic reasons sodium allylsulfonate and sodium methallylsulfonate are preferred. To achieve the production of stable dispersions, it is essential that the allylsulfonate or methallylsulfonate salt be used in amounts less than 1% by weight of that of the vinyl acetate monomer polymerized. It has been found that the films prepared from the dispersions of this invention become increasingly water resistant as the amount of allylsulfonate or methallylsulfonate salt used is decreased, down to a limit of about 0.02% by weight of the polyvinyl acetate emulsion formed. Lower concentrations of allylsulfonate of methallylsulfonate salt tend to lower the dispersion stability without any significant improvement in film properties. The preferred concentration range of sulfonate salt lies between about 0.04% and about 0.2% related to the vinyl acetate.

The dispersion polymerization of vinyl acetate with small amounts of allylsulfonate or methallylsulfonate salt is best conducted at a temperature such that the mixture reacting as under gentle reflux. The temperature may range between 60 to 95° C. In general, the rate of polymer formation will be greater as the temperature is raised. While, in the examples all the water and the catalyst or initiator and the allylicsulfonate were charged into the reactor and then the vinyl acetate added as polymerization proceeded it is possible to vary the procedure in several ways. Thus, the mixtures of monomers and initiator may be fed into the reactor simultaneously in such a manner as to allow a continuous process. This invention is not restricted as to the specific means for bringing the reactants together.

Dispersions produced by polymerizing vinyl acetate in an aqueous system with less than 1% by weight of a soluble salt of allylsulfonic acid or methallylsulfonic acid are exceptionally stable so that substantially no settling out or flocculation of solids takes place after long periods of stirring or storage at room temperatures down to +5° C. Such dispersions are also stable when diluted with additional water. Thus, dispersons containing 2% solids by weight were shelf-stable for weeks.

Dispersions containing about 40 to 60% solids by weight are preferably prepared by the present process. However, dispersions containing a higher or a lower percentage of solids can be made.

The allylsulfonate or methallylsulfonate salt stabilized polyvinyl acetate dispersions of this invention have valuable film forming properties. Thus, the films made from these emulsions on drying are water repellent and water nonredispersible and are, therefore, of great utility in many applications where these properties are important, such as in water base emulsion type paints, non-woven fabrics, and in improving the wet strength of paper.

I claim:
1. The process comprising polymerizing a monomeric mixture consisting of vinyl acetate and 0.02% to 1% by weight of said vinyl acetate of a member selected from the group consisting of alkali metal salts of allylsulfonic acid and methallylsulfonic acid in an aqueous medium at a temperature between about 60° C. and 95° C. and in the presence of a polymerization catalyst.

2. The process comprising polymerizing a monomeric mixture consisting of vinyl acetate and 0.02% to 0.5% by weight of said vinyl acetate of a member selected from the group consisting of alkali metal salts of allylsulfonic acid and methallylsulfonic acid in an aqueous medium at a temperature between about 60° C. and 95° C. and in the presence of a polymerization catalyst.

3. The process comprising polymerizing a monomeric mixture consisting of vinyl acetate and 0.02% to 0.5% by weight of said vinyl acetate of an alkali metal salt of allylsulfonic acid in an aqueous medium at a temperature between about 60° C. and 95° C. and in the presence of a polymerization catalyst.

4. The process of claim 2 wherein the monomeric mixture consists of vinyl acetate and 0.02% to 0.5% by weight of said vinyl acetate of sodium allylsulfonate.

5. The process of claim 2 wherein the monomeric mixture consists of vinyl acetate and 0.02% to 0.5% by weight of said vinyl acetate of sodium methallylsulfonate.

6. The process of claim 4 wherein the polymerization catalyst is potassium persulfate.

7. The process comprising polymerizing a monomeric mixture consisting of vinyl acetate and 0.02% to 0.2% by weight of said vinyl acetate of sodium allylsulfonate in an aqueous medium at a temperature between about 60° C. and 95° C. and in the presence of potassium persulfate as polymerization catalyst.

8. An aqueous dispersion of a polymer of vinyl acetate, said dispersion being made by polymerizing a monomeric mixture consisting of vinyl acetate and 0.02% to 1% by weight of said vinyl acetate of a member selected from the group consisting of alkali metal salts of allylsulfonic acid and methallylsulfonic acid in an aqueous medium at a temperature between about 60° C. and 95° C. and in the presence of a polymerization catalyst.

9. An aqueous dispersion of a polymer of vinyl acetate, said dispersion being made by polymerizing a monomeric mixture consisting of vinyl acetate and 0.02% to 1% by weight of said vinyl acetate of an alkali metal salt of allylsulfonic acid in an aqueous medium at a temperature between about 60° C. and 95° C. and in the presence of a polymerization catalyst.

10. An aqueous dispersion comprising between about 40% and 60% by weight of a polymer of vinyl acetate, said dispersion being made by polymerizing a monomeric mixture consisting of vinyl acetate and 0.02% to 0.2% by weight of said vinyl acetate of a member selected from the group consisting of alkali metal salts of allylsulfonic acid and methallylsulfonic acid in an aqueous medium at a temperature between about 60° C. and 95° C. and in the presence of a polymerization catalyst.

11. An aqueous dispersion comprising between about 40% and 60% by weight of a polymer of vinyl acetate, said dispersion being made by polymerizing a monomeric mixture consisting of vinyl acetate and 0.02% to 0.2% by weight of said vinyl acetate of an alkali metal salt of allylsulfonic acid in an aqueous medium at a temperature between about 60° C. and 95° C. and in the presence of a polymerization catalyst.

12. An aqueous dispersion comprising between about 40% and 60% by weight of a polymer of vinyl acetate, said dispersion being made by polymerizing a monomeric mixture consisting of vinyl acetate and 0.02% to 0.2% by weight of said vinyl acetate of sodium allylsulfonate in an aqueous medium at a temperature between about 60° C. and 95° C. and in the presence of a polymerization catalyst.

References Cited in the file of this patent
UNITED STATES PATENTS

| | | |
|---|---|---|
| 2,300,920 | Heuer | Nov. 3, 1942 |
| 2,601,256 | Bruson | June 24, 1952 |